(12) United States Patent
Kaufmann

(10) Patent No.: US 12,153,146 B2
(45) Date of Patent: Nov. 26, 2024

(54) CALIBRATING A VEHICLE-MOUNTED GNSS ANTENNA

(71) Applicant: u-blox AG, Thalwil (CH)

(72) Inventor: Thomas Kaufmann, Thalwil (CH)

(73) Assignee: u-blox AG, Thalwil (CH)

( * ) Notice: Subject to any disclaimer, the term of this patent is extended or adjusted under 35 U.S.C. 154(b) by 149 days.

(21) Appl. No.: 17/581,024

(22) Filed: Jan. 21, 2022

(65) Prior Publication Data

US 2022/0244405 A1  Aug. 4, 2022

(30) Foreign Application Priority Data

Jan. 29, 2021 (EP) ..................... 21154448

(51) Int. Cl.
*G01S 19/40* (2010.01)
*G01S 19/23* (2010.01)

(52) U.S. Cl.
CPC .............. *G01S 19/40* (2013.01); *G01S 19/23* (2013.01); *G01S 19/235* (2013.01)

(58) Field of Classification Search
CPC .................................................... G01S 19/235
See application file for complete search history.

(56) References Cited

FOREIGN PATENT DOCUMENTS

| EP | 3859397 | 8/2021 | |
|---|---|---|---|
| WO | WO 2015113649 | 8/2015 | |
| WO | WO 2018121879 | 7/2018 | |
| WO | WO-2020108782 A1 * | 6/2020 | ........... G01S 19/235 |

OTHER PUBLICATIONS

F. van Graas et al., GPS Antenna Phase and Group Delay Corrections, Proceedings of the 2004 National Technical Meeting of The Institute of Navigation, p. 399-408 (Year: 2004).*
T. Kersten et al., Towards Modeling Phase Center Variations for Multi-Frequency and Multi-GNSS, 5th ESA Workshop on Satellite Navigation Technologies and European Workshop on GNSS Signals and Signal Processing (NAVITEC), 8 pages (Year: 2010).*
A. Kumar et al., Improved Phase Center Estimation for GNSS Patch Antenna, IEEE Transactions on Antennas and Propagation, vol. 61(4), p. 1909-1915 (Year: 2013).*
Extended European Search Report in European Appln. No. 21154448.1, mailed on Oct. 26, 2021, 11 pages.
Li et al., "Phase and group delay analysis for patch antenna," 2015 Asia-Pacific Microwave Conference (APMC), Dec. 6-9, 2015, Nanjing, China, vol. 3, pp. 1-3.
Partial European Search Report in European Appln. No. 21154448.1, mailed on Jul. 26, 2021, 6 pages.

* cited by examiner

*Primary Examiner* — Bernarr E Gregory
*Assistant Examiner* — Fred H Mull
(74) *Attorney, Agent, or Firm* — Fish & Richardson P.C.

(57) ABSTRACT

A method is provided for calibrating a vehicle-mounted GNSS antenna. The method comprises measuring a response of the antenna, while the antenna is mounted on the vehicle. Based on the measured response, data characterizing a group delay variation of the antenna is calculated. The data may be used to correct ranging measurements derived from GNSS signals received via the vehicle-mounted antenna. Alternatively or in addition, the data may be used in estimating the integrity of a position fix.

6 Claims, 6 Drawing Sheets

CALIBRATING A VEHICLE-MOUNTED GNSS ANTENNA

CROSS-REFERENCE TO RELATED APPLICATIONS

This application claims priority to European Application No. EP21154448.1, filed on Jan. 29, 2021, the contents of which are incorporated herein by reference in their entirety.

FIELD OF THE INVENTION

The present invention relates to antennas suitable for a global navigation satellite system (GNSS) receiver. In particular, it relates to vehicle-mounted GNSS antennas.

BACKGROUND OF THE INVENTION

Antennas that are suitable for a global navigation satellite system (GNSS) receiver are known. A GNSS receiver acquires satellite signals transmitted from a GNSS satellite constellation through such an antenna. A GNSS antenna is often mounted to a vehicle in order to provide vehicle positioning data. The antenna could be mounted on the vehicle as part of a vehicular navigation system, a toll tag, or other vehicle-based system that requires precise vehicle positioning information.

Typically, low-cost GNSS antennas are mounted to vehicles for cost efficiency. The GNSS antenna may commonly be mounted to a vehicle roof, for example, in order to give a good view of the sky.

SUMMARY OF THE INVENTION

The invention is defined by the claims. According to a first aspect, there is provided a method of calibrating a vehicle-mounted GNSS antenna, the method comprising:
  measuring a response of the antenna, while mounted on the vehicle, for each of a first plurality of angles in a first angular dimension, and for each of a second plurality of angles in a second angular dimension; and
  calculating, based on the measured response, a group delay variation of the antenna, with respect to the first and second angular dimensions.

This can enable a more accurate characterisation of the response of the antenna, taking into account the effects of the vehicle on the radiation pattern and therefore the group delay exhibited by the antenna in different directions. This can further enable a method of calibrating a vehicle-mounted GNSS antenna to correct or compensate for group delay variation.

The antenna may be mounted directly to a body panel of the vehicle. This may be desirable for low cost GNSS antennas, and may also be desirable from the perspective of vehicle design. It can allow the body panel (which is typically metallic) to function as a ground plane for the antenna. At the same time, it can avoid the need for a larger antenna structure—contained in, for example, a fairing projecting from the body of the vehicle. However, the inventors have recognised that mounting a low-cost antenna to the body of a vehicle can systematically affect the group delay variation in a way that is specific to the particular vehicle, and the particular mounting location of the antenna. They have further recognised that it would be desirable to characterize these group delay variations, for use in improving the accuracy of a position fix and/or improving the accuracy with which the integrity of a position fix can be estimated.

The first and second angular dimensions may be independent of one another, or preferably orthogonal to one another The first and second angular dimensions may be elevation and azimuth, respectively. The first and second angular dimensions may be theta and phi, respectively. The first angular dimension may represent an angle in a vertical plane (e.g. theta or elevation). The second angular dimension may represent an angle in a horizontal plane (e.g. phi or azimuth).

In measuring the response of the antenna, the response is preferably measured for each of the second plurality of angles at every angle of the first plurality of angles (and vice versa). Consequently, the output of the measurement is a two-dimensional function.

The measuring may include measuring the response at least at two different frequencies.

The measuring may comprise determining a phase of a signal received at the antenna at each of the first plurality of angles and each of the second plurality of angles.

The phase may comprise a phase of an electric field of the signal. In particular, it may comprise the phase of a circularly polarized electric field, for example a right-hand circularly polarized electric field.

The calculating may comprise unwrapping the phase of the signal to produce an unwrapped phase.

Unwrapping the phase may comprise unwrapping the phase along the first angular dimension, followed by unwrapping the phase along the second angular dimension.

The calculating may comprise calculating a phase center offset of the antenna.

The phase center offset (PCO) may be calculated for a given constellation of space vehicles (for example, for the GPS constellation) and for a given frequency band. A first PCO may be calculated for a first frequency band and a second PCO may be calculated for a second frequency band.

The PCO may be calculated as the phase center that minimises the phase center variation in all directions. The variation may be minimised according to a least squares criterion.

The PCO may be calculated based on the unwrapped phase.

The calculating may comprise calculating, for at least one frequency of interest, phase center variations with respect to the first and second angular dimensions.

The phase center variations (PCV) may be calculated at least at two different frequencies. The at least two different frequencies may be centered about the at least one frequency of interest. The phase center variations may be calculated based on the unwrapped phase.

The calculating may comprise calculating the group delay variation based on a change of phase center variation with respect to frequency, for the at least one frequency of interest.

The group delay variation may be calculated based on a derivative or gradient of the phase center variation with respect to frequency. In particular, the group delay variation may be calculated based on the derivative or gradient of the phase center variation (with respect to frequency) at the at least one frequency of interest.

The calculating may comprise calculating the group delay variation based on a difference between phase center variations at two different frequencies, centered at the frequency of interest.

The two different frequencies are centered at a frequency of interest (such as a carrier frequency of a signal to be received by the antenna). That is, a first phase center variation may be calculated at a first frequency, higher than the frequency of interest; a second phase center variation may be calculated at a second frequency, lower than the frequency of interest. The group delay variation may be calculated based on a difference between the first and second phase center variations.

The frequency of interest may be a GNSS carrier frequency.

The measuring may be performed in an anechoic chamber. The vehicle may be arranged on a turntable in the anechoic chamber. This may facilitate, in particular, measuring the response at each of the second plurality of angles.

The method of calibrating may be repeated with the antenna mounted on different vehicles—for example, different vehicle models made by the same manufacturer, or different vehicle models made by different manufacturers.

Also provided is data characterizing a group delay variation of an antenna when the antenna is mounted on a vehicle, wherein the group delay variation is characterized with respect to first and second angular dimensions.

The data may be generated by a method as summarized above.

The data may be stored on a computer readable storage medium, for example a non-transitory computer readable storage medium.

The data may comprise first data characterizing the group delay variation of the antenna when mounted on a first vehicle, and second data characterizing the group delay variation of the antenna when mounted on a second vehicle. The first vehicle may be a vehicle of a first model; the second vehicle may be a vehicle of a second, different model. The first and second models may be models produced by the same or different vehicle manufacturers. The first or second data may be used, as appropriate, when calculating a position fix for the first vehicle or second vehicle. Using data characterizing the antenna when mounted on the particular vehicle may improve the accuracy of positioning and/or may enable the integrity of the position fix to be estimated more accurately.

Alternatively or in addition, the data may comprise first data characterizing the group delay variation of the antenna when mounted in a first position on a vehicle, and second data characterizing the group delay variation of the antenna when mounted in a second position on the vehicle.

Also provided is a method of estimating integrity of a position fix derived from ranging measurements of GNSS signals received via a vehicle-mounted GNSS antenna, each ranging measurement relating to the GNSS signal of a respective space vehicle, the method comprising:
  obtaining the ranging measurements;
  calculating the position fix based on the ranging measurements;
  obtaining data characterizing a group delay variation of the antenna, with respect to first and second angular dimensions;
  obtaining an attitude estimate of the vehicle;
  for each ranging measurement,
    determining angular coordinates of the respective space vehicle from which the GNSS signal originated, in the first and second angular dimensions, and
    correcting the ranging measurement, using the data characterizing the group delay variation, based on the attitude estimate and the determined angular coordinates of the space vehicle; and
  estimating the integrity of the position fix based on the corrected ranging measurements.

Estimating the integrity of the position fix may comprise modelling an error distribution of the corrected ranging measurements.

Also provided is a method of correcting ranging measurements derived from GNSS signals received via a vehicle-mounted GNSS antenna, each ranging measurement relating to a signal of a respective space vehicle, the method comprising:
  obtaining the ranging measurements;
  obtaining data characterizing a group delay variation of the antenna with respect to first and second angular dimensions;
  obtaining an attitude estimate of the vehicle; and
  for each ranging measurement,
    determining angular coordinates of the respective space vehicle from which the GNSS signal originated, in the first and second angular dimensions; and
    correcting the ranging measurement, using the data characterizing the group delay variation, based on the attitude estimate and the determined angular coordinates of the space vehicle.

Correcting the ranging measurement may comprise adding or subtracting a correction to or from the ranging measurement based on a value of the group delay variation in the direction from which the signal arrived. The direction of arrival is calculated from the angular coordinates (for example, elevation and azimuth) of the space vehicle relative to the attitude estimate of the vehicle.

The method may further comprise calculating a position fix based on the corrected ranging measurements.

The method may further comprise estimating an integrity of the position fix, using the data characterizing the group delay variation, based on the attitude estimate and the determined angular coordinates of the space vehicle.

Estimating the integrity of the position fix may comprise modelling an error distribution of the corrected ranging measurements.

The ranging measurements may include, for example, a code phase pseudorange and/or a carrier phase pseudorange.

The data characterizing the group delay variation of the antenna preferably characterizes the group delay of the antenna when mounted on the vehicle. That is the data is preferably specific not just to the antenna, but to the combination of the antenna and the vehicle. The data may further be specific to a particular position of the antenna on the vehicle, wherein the antenna is mounted in that particular position.

The data characterizing the group delay variation of the antenna may be obtained from a method as summarized above.

The vehicle may be a land vehicle, in particular, a road-going vehicle such as a car, van, bus, coach, or truck. Obtaining the attitude estimate may comprise calculating the attitude estimate based at least in part on one or both of: inertial measurements; and a velocity estimate for the vehicle, based on GNSS measurements. The inertial measurements may be provided by one or more accelerometers, one or more gyroscopes, and/or a compass, mounted in the vehicle.

The antenna may be a patch antenna. The methods summarized above have been found to be particularly beneficial for low-cost antennas, such as patch antennas, since the response of these antennas is more likely to be influenced by interactions of the electric field with parts of the vehicle. For example, a patch antenna mounted on a roof of a vehicle may have a response that is sensitive to the shape of the roof and/or the location of the antenna on the roof. Therefore, it is advantageous to characterize (and optionally compensate for) the response of the antenna based on measurements.

Also provided is a computer program comprising computer program code configured to cause one or more physical computing devices to carry out all the steps of a method as summarized above when the computer program is executed by said one or more physical computing devices.

The computer program may be stored on a computer readable medium, optionally a non-transitory computer readable medium.

In particular in respect of the methods of estimating the integrity of, or correcting, ranging measurements, the one or more physical computing devices may include a processor of a GNSS receiver. The estimating or correcting may thus be performed on-board the GNSS receiver.

BRIEF DESCRIPTION OF THE DRAWINGS

The invention will now be described by way of example with reference to the accompanying drawings, in which.

Figure 1:
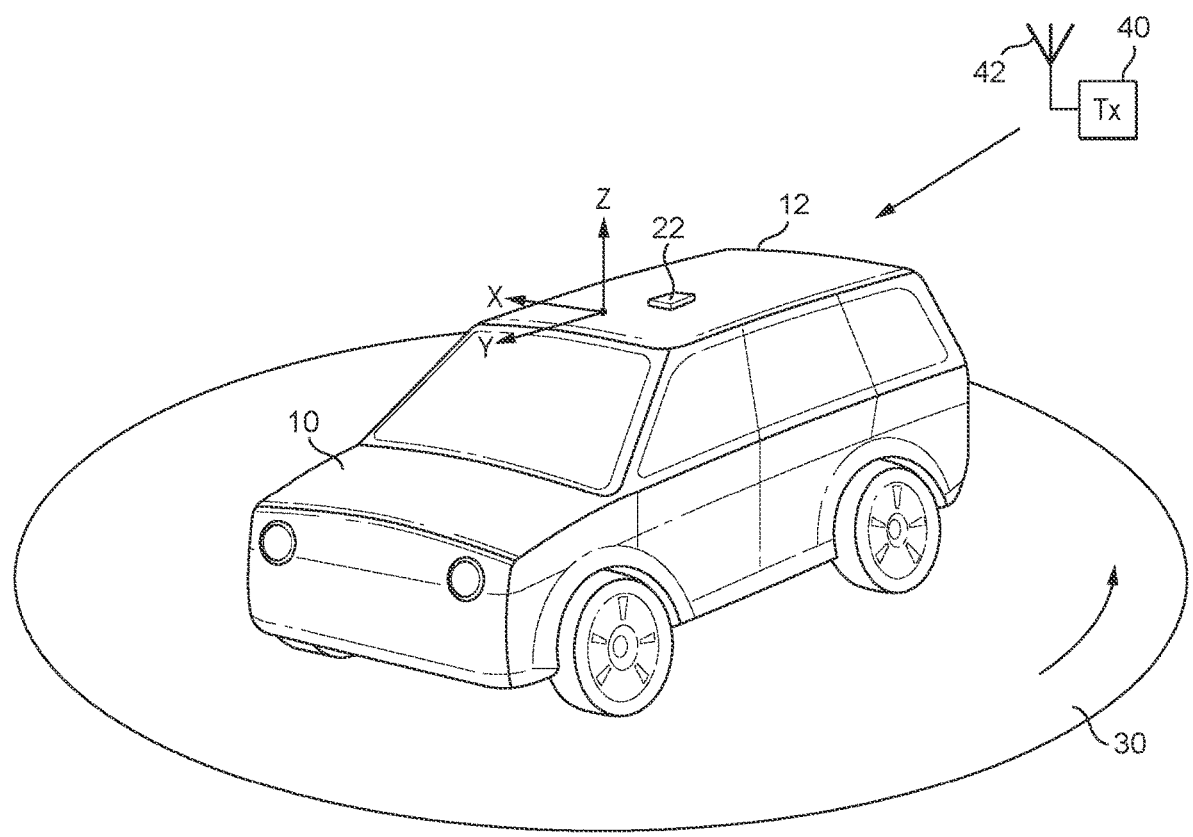
FIG. 1 is a schematic illustration of a vehicle on a turntable in an anechoic chamber.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

Reference will now be made in detail to embodiments of the invention, examples of which are illustrated in the accompanying drawings. The described embodiments should not be construed as being limited to the descriptions given in this section; the embodiments may have different forms.

The inventors have recognised that features of the vehicle, and the position of the GNSS antenna on the vehicle, can influence the performance of the antenna. Because vehicle body panels are often metallic, and therefore conductive, they can interact with the electric field of the antenna. For example, for an antenna mounted on a vehicle roof, the roof panel may act as a ground for the antenna. The shape of the roof and the position of the antenna on it may therefore affect the radiation characteristics of the antenna. The vehicle roof may act as a large non-symmetrical ground.

In particular, group delay variation (GDV) can occur, which may vary dependent on the elevation and azimuth of each incoming satellite signal (as well as depending on the frequency of the signal). Group delay variation may have a greater impact on positioning accuracy when the antenna is placed on a large, non-symmetrical ground. Such a ground may contain surface currents that act like antennas, introducing significant group delay variation.

The present inventors have recognised that the variations introduced by the arrangement of the antenna on the vehicle are to a large extent systematic and predictable. If they could be characterized, they could be compensated or corrected for, when carrying out positioning calculations. However, in order for the compensation/correction to be effective, the characterisation should take into account the combined properties of the antenna and vehicle—it is not sufficient to characterize the antenna in isolation.

FIG. 1 schematically illustrates a vehicle 10 on a turntable 30 in an anechoic chamber. A GNSS antenna 22 is mounted on the roof 12 of the vehicle 10. The GNSS antenna is coupled to a receiver 20 (not shown in FIG. 1). A transmitter 40 is coupled to an antenna 42 inside the anechoic chamber. Signals transmitted via the antenna 42 are received via the GNSS antenna 22. By rotating the turntable 30, and varying a height of the antenna 42, the behaviour of the GNSS antenna 22 can be characterized over a full range of angles of azimuth and elevation, while it is mounted in position on the vehicle.

The axes of a vehicle frame of reference are indicated in the drawing. The y-axis points in the forward direction of the vehicle; the x-axis points in the direction from the left side to the right side of the vehicle; and the z-axis points vertically upward. It should be understood that other axes or frames of reference may be used. Optionally, for convenience, the origin of the frame of reference may be located at the antenna reference point (ARP).

In the mathematical formulation below, an angle $\varphi$ refers to the azimuthal angle—that is, an angle in the horizontal x-y plane. An angle $\theta$ refers to the angle with the positive z-axis, in a vertical plane. Thus, the angle $\theta=0$ refers to the direction pointing to vertically upward. With this definition, the angle $\theta$ is related to the elevation angle by $\theta=(90°-$ elevation). Nevertheless, it should be understood that the choice of spherical coordinate system is not critical. Examples falling within the scope of the present disclosure can be practiced with any other suitable choice of spherical coordinates, including but not limited to the use of azimuth and elevation angles directly.

Figure 2:
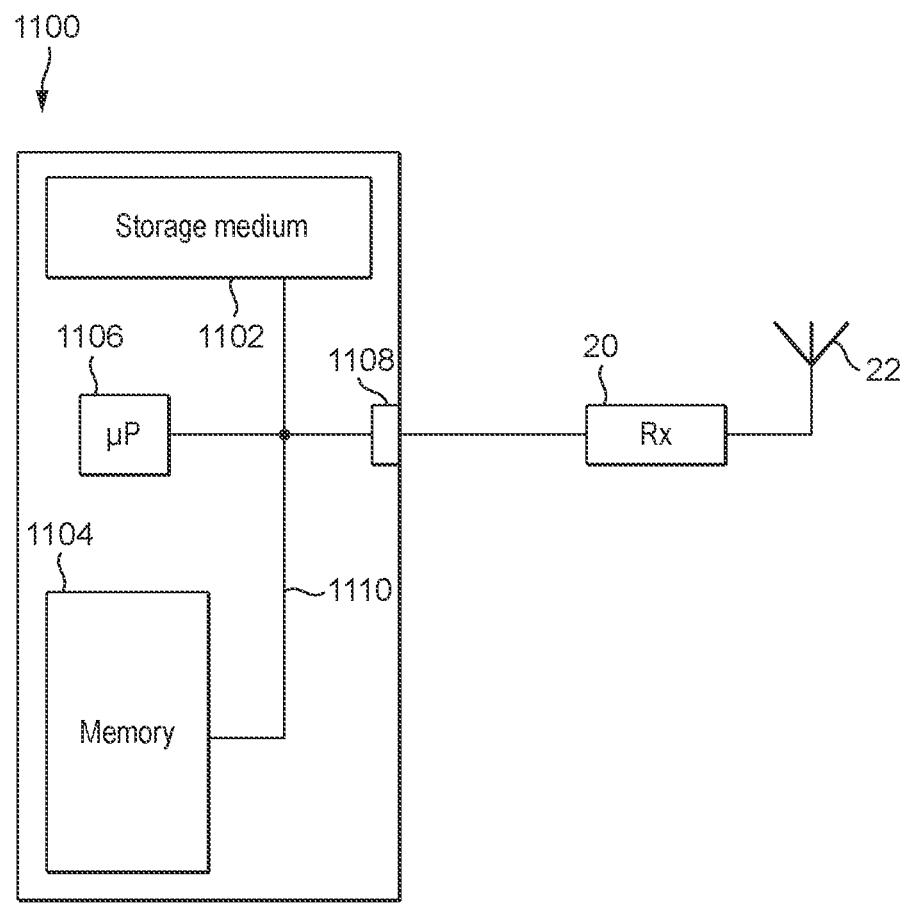
FIG. 2 is a block diagram of an exemplary computer system.

FIG. 2 schematically illustrates an exemplary computer system 1100 upon which exemplary methods in accordance with the present disclosure may run. The exemplary computer system 1100 comprises a computer-readable storage medium 1102, a memory 1104, a processor 1106 and one or more interfaces 1108, which are all linked together over one or more communication busses 1110. The exemplary computer system 1100 may take the form of a conventional computer system, such as, for example, a desktop computer, a personal computer, a laptop, a server, a mainframe computer, and so on.

The computer-readable storage medium 1102 and/or the memory 1104 may store one or more computer programs (or software, or code) and/or data. The computer programs stored in the computer-readable storage medium 1102 may include an operating system for the processor 1106 to execute in order for the computer system 1100 to function. The computer programs stored in the computer-readable storage medium 1102 and/or the memory 1104 may include computer programs according to examples of the present disclosure or computer programs that, when executed by the processor 1106, cause the processor 1106 to carry out a method according to an example.

The processor 1106 may be any data processing unit suitable for executing one or more computer readable program instructions, such as those belonging to computer programs stored in the computer-readable storage medium 1102 and/or the memory 1104. As part of the execution of one or more computer-readable program instructions, the processor 1106 may store data to and/or read data from the computer-readable storage medium 1102 and/or the memory 1104. The processor 1106 may comprise a single data processing unit or multiple data processing units operating in parallel or in cooperation with each other. The processor 1106 may, as part of the execution of one or more computer readable program instructions, store data to and/or read data from the computer-readable storage medium 1102 and/or the memory 1104.

The one or more interfaces 1108 comprise an interface to a receiver 20, configured to receive signals via the antenna 22. According to an example, the receiver 20 receives signals transmitted by the antenna 42, and the processor 1106 processes the received signals to calibrate the antenna 22.

Figure 3:
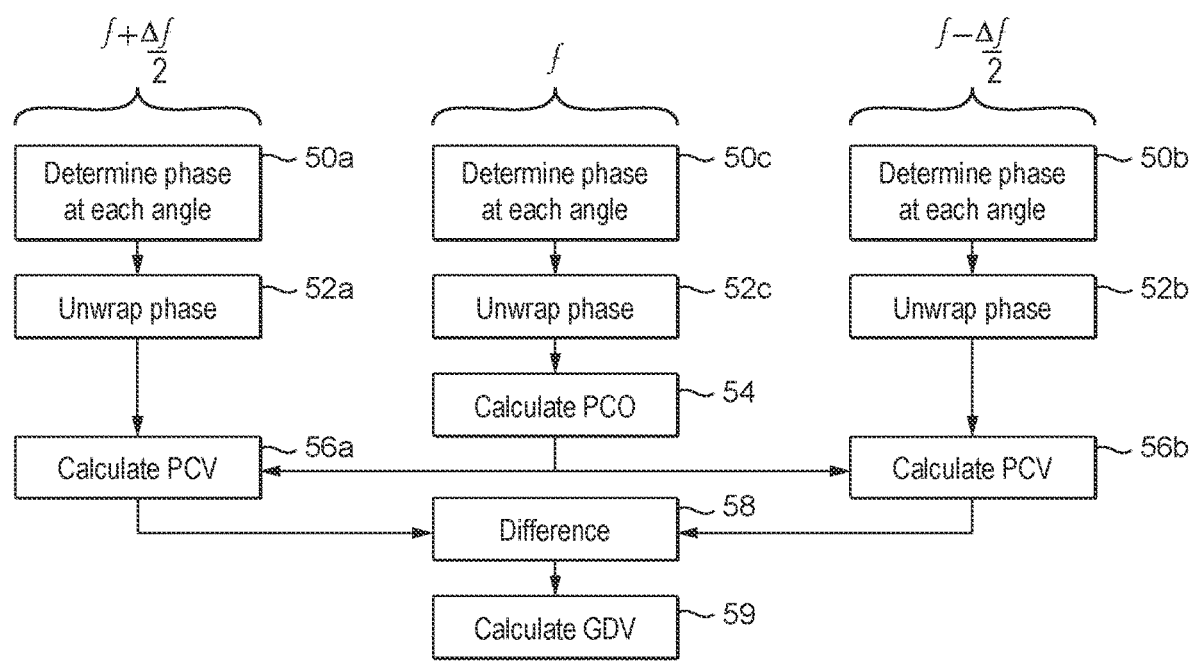
FIG. 3 is a flowchart illustrating a method of calibrating a vehicle-mounted GNSS antenna according to an example.

FIG. 3 is a flowchart of a method performed by the processor 1106, according to an example. A response of the antenna 22 is measured at (at least) two different frequencies, $$\left(f + \frac{\Delta f}{2}\right) \text{ and } \left(f - \frac{\Delta f}{2}\right),$$

centered about a frequency of interest f. The frequency of interest is a GNSS carrier frequency.

In step 50a, the processor 1106 and receiver 20 cooperate to determine the phase of the signal received at the antenna 22. In step 50a, the phase of the signal is determined at the first frequency, $$\left(f + \frac{\Delta f}{2}\right).$$

In step 50b, the phase of the signal is determined at the second frequency, $$\left(f - \frac{\Delta f}{2}\right).$$

In step 50c, the phase of the signal is determined at the frequency of interest, f. Since Δf is small in comparison with the bandwidth of the signal, the transmitter 40 transmitting via the antenna 42 at the GNSS carrier frequency will produce a phase response in the GNSS antenna 22 at both of the frequencies. In practice, the processor 1106 and receiver 20 may determine the phase of the received signal at more than these two frequencies—in particular, if it is desired to calculate the group delay variation (GDV) for several different GNSS carrier frequencies. The following description will focus on the case of measuring the GDV for a single carrier frequency. The same approach can be extended to additional carrier frequencies.

In each of steps 50a, 50b, and 50c, the phase is measured at every angle φ and every angle θ, to build up a full two-dimensional characterization of the phase according to the direction of arrival. As mentioned above, this is done by incremental rotation of the turntable 30, and incremental changes in the height of the antenna 42.

In step 52a, the processor 1106 unwraps the phase determined in step 50a. The phase determined in step 50a will typically be in a 360° range, such as the range −180° to +180°. However, phase is circular. When the phase crosses one of the boundaries of the range, it will appear to jump or step from (for example)+180° to −180°. Phase unwrapping removes these discontinuities in the phase. The unwrapped phase is therefore no longer contained in a 360° range.

In step 52b, the processor 1106 unwraps the phase determined in step 50b in the same way. Similarly, in step 52c, the processor 1106 unwraps the phase determined in step 50c.

In step 54, the processor 1106 calculates the phase center offset (PCO) of the antenna at the frequency of interest, f, based on the unwrapped phase obtained in step 52c.

In step 56a, the processor 1106 calculates the phase center variation (PCV) based on the unwrapped phase obtained in step 52a and the PCO calculated in step 54. This produces the PCV at the first frequency, $$\left(f + \frac{\Delta f}{2}\right).$$

A corresponding calculation is performed in step 56b to produce the PCV at the second frequency, $$\left(f - \frac{\Delta f}{2}\right).$$

In step 58, the processor 1106 calculates the difference between the two PCVs; and, based on this difference, the processor 1106 calculates the GDV at the carrier frequency in question, in step 59.

Each of these steps will now be described in further detail. It should be noted that, since an antenna responds similarly whether it is transmitting or receiving, the direction of measurement may be reversed. That is, the transmitter 40 may be coupled to the vehicle-mounted GNSS antenna, and the receiver 20 may be coupled to the antenna 42 in the anechoic chamber.

It is assumed that the group delay variations are predominantly from the right-hand circularly polarized (RHCP) component of the combined antenna and vehicle. Multipath is not modeled in the present example. It can be dealt with by other means, and tends to vary depending on the RF environment.

When measuring the response of the vehicle-mounted antenna 22, the received (or radiated) electric fields may be extracted either from near-field or far-field measurements. In practice, there is a limited resolution in angle and frequency. A high angular resolution, of around 1°, is desirable in order to improve the quality of the estimate of the phase center offset. A high frequency resolution of around 1 MHz is desirable for a good estimate of the derived group delay variations.

In the following, the methodology to compute the group delay variation is described.

In step 50, the theta and phi components of the electric field: $E_\theta(\varphi,\theta,f), E_\varphi(\varphi,\theta,f)$ are extracted from the measurements. The right-hand circularly polarized electric field is calculated as follows:

$$E_{RHCP}(\varphi, \theta, f) = \frac{1}{\sqrt{2}}(E_\theta(\varphi, \theta, f) + j \cdot E_\varphi(\varphi, \theta, f))$$

For phase center offset calculations, only electric fields above the horizon are considered:

$$E_{RHCP\ Upper}(\varphi,\theta,f) = E_{RHCP}(\varphi,\theta,f)|_{\theta \leq \pi/2}.$$

The phase is extracted from the right-hand circularly polarized electric field:

$$\phi_{RHCP\ Upper}(\varphi,\theta,f) = \angle E_{RHCP\ Upper}(\varphi,\theta,f).$$

In step 52, the phase is unwrapped to avoid phase jumps. The approach taken in the present example is to first unwrap along $\theta$, and then along $\varphi$:

$$\phi_{RHCP\ Upper\ Unwrapped}(\varphi,\theta,f) = \text{unwrap}(\text{unwrap}(\Phi_{RHCP\ Upper}(\varphi,\theta,f),\theta),\varphi).$$

Next, in step 54, for each frequency of interest, the PCO is calculated. This is done at least for the carrier of each signal of interest—for example, 1575.42 MHz for GPS L1CA and Galileo E1, 1561.098 MHz for BeiDou B1I, for each GLONASS channel carrier, and so on).

To calculate the PCO a matrix is created with all N sample points for $\varphi$ and all M sample points for $\theta$:

$$M = \begin{pmatrix} \cos\varphi_1 \cdot \sin\theta_1 & \sin\varphi_1 \cdot \sin\theta_1 & \cos\theta_1 & 1 \\ \cos\varphi_1 \cdot \sin\theta_2 & \sin\varphi_1 \cdot \sin\theta_2 & \cos\theta_2 & 1 \\ \ldots & \ldots & \ldots & \ldots \\ \cos\varphi_2 \cdot \sin\theta_1 & \sin\varphi_2 \cdot \sin\theta_1 & \cos\theta_1 & 1 \\ \ldots & \ldots & \ldots & \ldots \\ \cos\varphi_N \cdot \sin\theta_M & \sin\varphi_N \cdot \sin\theta_M & \cos\theta_M & 1 \end{pmatrix}$$

This matrix is of size (M·N)×4.
Then a vector is set up with the phase (in meters):

$$\lambda = \frac{c_0}{f};$$

$$\Psi(f) = \begin{pmatrix} \phi_{RHCP\ Upper\ Unwrapped}(\varphi_1, \theta_1, f) \\ \phi_{RHCP\ Upper\ Unwrapped}(\varphi_1, \theta_2, f) \\ \ldots \\ \phi_{RHCP\ Upper\ Unwrapped}(\varphi_2, \theta_1, f) \\ \ldots \\ \phi_{RHCP\ Upper\ Unwrapped}(\varphi_N, \theta_M, f) \end{pmatrix} \cdot \frac{\lambda}{2\pi}$$

This vector is of length (M·N).
The phase center offset (and phase offset) can then be computed as follows:

$$V(f) = \begin{pmatrix} x(f) \\ y(f) \\ z(f) \\ \phi_0(f) \end{pmatrix} = M(f)^{-1} * \Psi(f)$$

This can be solved using a least squares (LS) solver. The PCO consists of the first three components of this vector:

$$PCO = \begin{pmatrix} x(f) \\ y(f) \\ z(f) \end{pmatrix}.$$

The phase offset $\phi_0(f)$ is relevant for the subsequent calculations, but in general it does not need to be used or reported separately. Note that the phase center offset and phase offset are calculated in particular for the frequency of interest, f.

Based on the PCO calculated in step 54, the PCV is calculated in step 56. The phase center variation can be simply computed as the difference between the phase translated to the phase center offset and the measured phase:

$$PCV(\varphi, \theta, f) = \text{reshape}(M * V(f) - \Psi(f), M, N) \cdot \frac{2\pi}{\lambda}.$$

The PCV here is given in radians, because it is rescaled by $$\frac{2\pi}{\lambda}.$$

This is assumed in the equations below. Nevertheless, the PCV may also be reported in meters.

To compute the group delay variation, the PCV centered around the frequency of interest, f, is calculated:

$$\Psi_0(f) = (M * V(f));$$

$$PCV^+(f) = \text{reshape}\left(\Psi_0(f) - \Psi\left(f + \frac{\Delta f}{2}\right), N, M\right) \cdot \frac{2\pi}{\lambda};$$

$$PCV^-(f) = \text{reshape}\left(\Psi_0(f) - \Psi\left(f - \frac{\Delta f}{2}\right), N, M\right) \cdot \frac{2\pi}{\lambda}.$$

The PCV is centered around the frequency of interest in order to calculate the GDV at the frequency of interest:

$$GDV(\varphi, \theta, f) = -\frac{PCV^+ - PCV^-}{2\pi\Delta f}.$$

This calculation relies on the fact that the group delay is the derivative of phase with respect to frequency. The numerator in this expression is represented by step 58 in FIG. 3. The final step 59 to calculate the GDV is the division by $2\pi\Delta f$.

It should be noted that, since the measurements usually sweep the frequency in regular steps, it is possible that not all carrier frequencies will be captured perfectly. When this happens, the closest sampled frequency to the carrier frequency can be selected, as a suitable approximation.

As indicated above, the GDV characterizes the variation in group delay over the full range of angles $(\varphi,\theta)$, at least at one frequency of interest. It may be stored as an array of GDV values—for example, a 2-D array with dimensions 360×90, with a resolution of 1° over the 360° range of azimuth ($\varphi$), and a resolution of 1° over the 90° range of elevation (or $\theta$). This discrete characterization of the GDV of a particular GNSS antenna, mounted in a particular place on a particular vehicle, can then be used to improve the accuracy of positioning calculations for that particular configuration of vehicle and GNSS antenna. Having been calculated from measurements in the anechoic chamber, the array of data can be distributed to GNSS receivers installed in vehicles of that type, with the same GNSS antenna mounted in the same place. These GNSS receivers can then incorporate in their calculations the knowledge of the systematic variations in group delay due to the interactions between the antenna and the vehicle.

The GDV data may be provided to a GNSS receiver in a variety of ways. For example, if the GNSS receiver is integrated in the vehicle at the time of manufacture, the vehicle manufacturer may preload a memory of the GNSS receiver with the GDV data. Alternatively, if the vehicle has mobile (for example, cellular) connectivity, the GDV data may be downloaded to the GNSS receiver—for example, by means of a firmware update via a cellular network.

The GDV can be used, for example, to improve the calculation of a position fix for the vehicle. It can also be used to improve the estimation of the integrity of the position fix. Integrity is an important facet of the positioning solution, in many applications. It refers to the ability to reliably estimate error bounds on position fixes.

Figure 4:
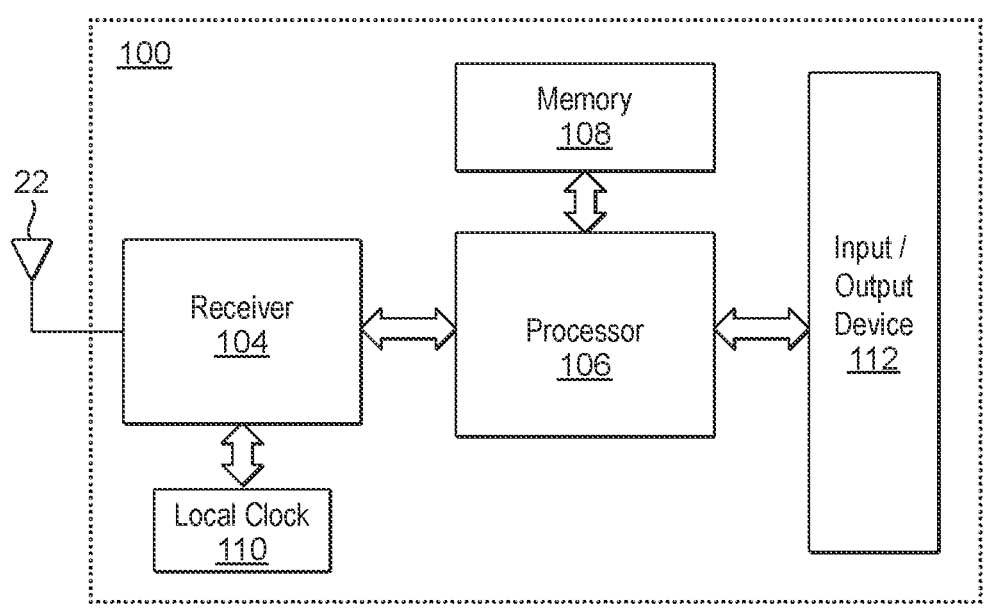
FIG. 4 is a block diagram of a GNSS receiver according to an example.

FIG. 4 is a block diagram of a GNSS module 100 according to an example. Module 100 is coupled to the antenna 22. In particular, module 100 includes a receiver 104 coupled to the antenna 22, a processor 106, a memory 108, a local clock 110, and an Input/Output device 112.

Note that antenna 22 is the same antenna, mounted in the same position, as the antenna 22 that was characterized in the method of FIG. 3. Antenna 22 is configured to receive a GNSS signal. The GNSS signal may be received from a single satellite or a plurality of satellite signals respectively transmitted from a plurality of satellites in a plurality of frequency bands. The GNSS signal may also include signals originating from one or more virtual sources that reflect and/or scatter satellite signals. However, the signals received by antenna 22 are not limited to satellites signals, and can be any electromagnetic waves transmitted from any sources, for example, wireless cellular signals. Antenna 22 may be any type of antenna, for example, a patch antenna, a helix antenna, a crossed bow antenna, orthogonally placed monopole antennas, etc. Antenna 22 may be an array of antennas.

Receiver 104 is coupled to antenna 22 and configured to receive the GNSS signal via antenna 22. The GNSS signal received by antenna 22 may be transmitted to receiver 104 via a coaxial RF cable or any other cable suitable for transmitting an RF signal. In an embodiment, receiver 104 may be part of a transceiver modem which includes a transmitter configured to transmit data to an external device.

Receiver 104 may perform operations on the received GNSS signal, such as amplification, filtering, mixing, and digitization. Receiver 104 may also process the digitized signal and produce measurements, such as pseudorange measurement and carrier phase measurement. Receiver 104 may also determine measurement quality indicators, also referred to as quality metrics. The quality metrics may provide information about the quality of an environment in which the measurements are performed. Examples of the quality metrics include, but are not limited to, a carrier-to-noise density ratio, a satellite elevation, a phase lock time, a code lock time, and a cycle slip. The accuracy of the measurements made by receiver 104 may be correlated with the quality metrics associated with the measurements. Receiver 104 is also configured to communicate with the clock 110.

Processor 106 may include one or more dedicated processing units, application-specific integrated circuits (ASICs), field-programmable gate arrays (FPGAs), or various other types of processors or processing units. Processor 106 may receive, from receiver 104, the results of the pseudorange and carrier phase measurements, and the quality metrics associated with the measurements. Processor 106 may further process the information to estimate a current position of module 100 and a protection level of the position estimate. Processor 106 may also provide measurement quality metrics of its own. In an embodiment, processor 106 may include a navigation filter (for example, a Kalman filter or a recursive LS filter) for determining a protection level.

Processor 106 may be coupled to an external motion sensor, such as an accelerometer, a gyroscope, or a wheel speed sensor, to obtain position tracking information from the motion sensor and contribute to the determination of the protection level. Alternatively, some of these sensors, such as an accelerometer or a gyroscope, may be integrated in the module 100 itself. Processor 106 is also configured to communicate with Input/Output device 112, and memory 108. In an embodiment, receiver 104 may include a built-in processor (not shown) that performs all or part of the function of processor 106. In an embodiment, the built-in processor of receiver 104 may be a front-end processor that controls signal processing in receiver 104, and processor 106 may be a back-end processor that performs further computations based on the signal processing in receiver 104. In an embodiment, processor 106 may assign a computation task to a remote computer (not shown) so that the remote computer performs a portion of the computations and transmits the computation results to processor 106.

Memory 108 may be any type of computer-readable storage medium including volatile or non-volatile memory devices, or a combination thereof. Memory 108 may store information related to identities of module 100 and the GNSS signals received by antenna 22. Memory 108 may also store post-processing signals. Memory 108 may also store the pseudorange and the carrier phase measurements and the quality metrics associated with the measurements and measurements from other sensors. Memory 108 may also store computer-readable program instructions, mathematical models, and algorithms that are used in signal processing in receiver 104 and computations in processor 106. Memory 108 may further store computer-readable program instructions for execution by processor 106 to operate module 100.

Local clock 110 provides a time of a local place at which module 100 is disposed. Local clock 110 may be used to determine arrival time of a signal that is used in the pseudorange measurement and the position estimation. Input/Output device 112 may be used to communicate a result of signal processing and computation to a user or another device. Input/Output device 112 may include a user interface including a display and an input device to transmit a user command to processor 106. The display may be configured to display a status of signal reception at module 100, the data stored at memory 108, a status of signal processing, and a result of computation, etc. For example, the display may display results of determined protection level to a user so that the user may have a better understanding of the position of module 100. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc. Input/Output device 112 may further include a machine interface, such as an electrical bus connection or a wireless communications link.

Figure 5:
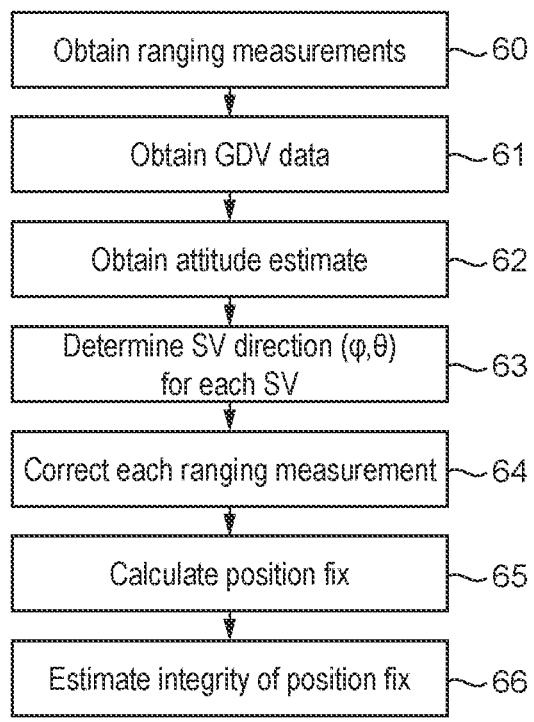
FIG. 5 is a flowchart illustrating a method of correcting ranging measurements, according to an example.

FIG. 5 is a flowchart illustrating a method of correcting ranging measurements, based on GDV data. The method may be performed by the processor 106 of the module 100, according to an example.

In step 60, the processor 106 obtains the ranging measurements (for example, code phase pseudoranges, or carrier phase pseudoranges) from the receiver 104. In step 61, the processor 106 obtains the GDV data from the memory 108. The GDV data was prepared earlier (for example, using the method of FIG. 3), and was stored in the memory 108 either upon installation of the module 100 in the vehicle, or via a later firmware update.

In step 62, the processor obtains an attitude estimate of the vehicle. The attitude estimate may be derived from a velocity estimate (for example, calculated by the processor as part of the navigation solution). The attitude describes the direction in which the vehicle is pointing. That is, it may comprise a unit vector in the same direction as the velocity. The velocity estimate and/or attitude estimate may be based at least in part on inertial measurements provided by one or more sensors, such as an accelerometer and gyroscope. In some examples, these inertial measurements are incorporated into the navigation solution, and therefore into the velocity estimate.

In step 63, the processor 106 determines the angular coordinates of the respective space vehicle (SV) from which each of the GNSS signals was received (and based on which each of the ranging measurements was derived). In other words, the processor determines the line-of-sight direction along which the respective GNSS signal arrived at the antenna 22. This can be done by comparing the current position of each SV (for example, derived from the ephemeris in the GNSS navigation message) with the current attitude estimate of the vehicle.

Knowing the angular coordinates (φ,θ) of each SV, relative to the vehicle reference frame, the processor 106 can then look up the GDV for that direction, in the array of GDV data. In step 64, the processor 106 corrects each ranging measurement based on the relevant respective value of GDV found in the array. The correction may comprise adding or subtracting the GDV value for the relevant direction to/from the pseudorange (depending on whether the GDV values are stored as positive or negative corrections).

In step 65, the processor 106 computes a position fix using the corrected ranging measurements determined in step 64. The position fix may be calculated from these corrected ranging measurements in the normal way, by trilateration.

In step 66, the processor further calculates an integrity estimate for the position fix calculated in step 65. The integrity estimate may be provided as a protection level, which describes an expected maximum position error, based on some predefined probability threshold. For example, a reported protection level of 2 m may indicate that there is a probability of (for example) 99% that the position fix is within 2 m of the true geographic position. A reported protection level of 0.5 m would likewise indicate that there is a 99% probability that the position fix is within 0.5 m of the true position.

Calculating the integrity estimate may comprise modelling a probability distribution of the residual error in each of the ranging measurements. The "residual error" may be defined as the difference between the pseudorange reported by the receiver 104, and the geometric range calculated as the distance between the position fix and the relevant SV. If a residual error is large, this indicates poor agreement between the respective pseudorange and the position fix. On the contrary, if the residual error is small, this indicates good agreement between that pseudorange and the position fix. If all of the residual errors are small, then the system can have greater confidence that the position fix is accurate. The relationship between the residual errors and the protection level can be quantified in a probabilistic manner. In particular, a probabilistic model can be derived in advance, based on experimental data relating measured residual errors to known reference position data. Examples of suitable approaches for modelling the probability distribution of the residual error may be found, for example, in EP 20170246.1, filed on 17 Apr. 2020, and in WO 2018/121879 A1, both of which are incorporated herein by reference.

Note that, if the residual errors were to be based on the uncorrected pseudoranges, then the systematic effect of group delay variation would appear instead as additional noise in the residuals. This would cause a larger spread in the probability distribution of the residuals. In turn, this would lead to less accurate integrity estimates. In order to have (for example) 99% confidence in the protection level, a larger value would have to be reported for the protection level, in order to accommodate the increased variance introduced by the uncorrected pseudoranges and their noisier residuals.

In short, by basing the integrity estimate on pseudoranges corrected using the GDV data, the present example can provide greater confidence in the position fix (for instance, in the form of a smaller protection level). This may be in addition to increased accuracy in the position fix, due to the use of the corrected pseudoranges in the calculation of the position fix.

Figure 6:
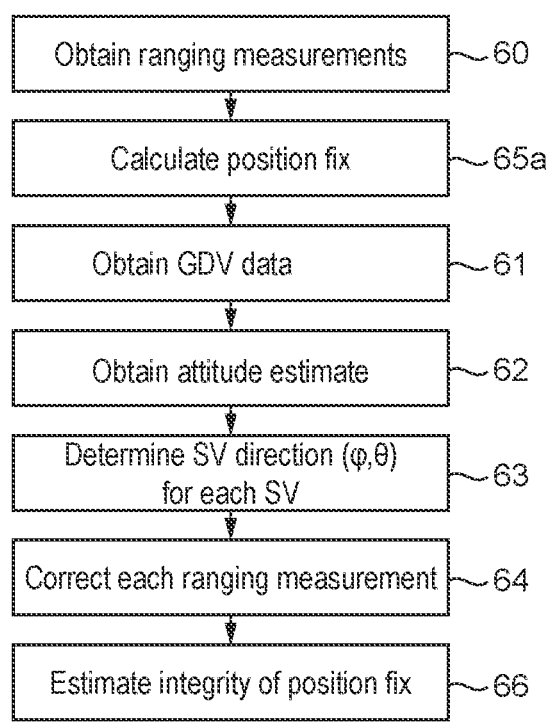
FIG. 6 is a flowchart illustrating a method of estimating the integrity of a position fix, according to an example.

It should be noted that it is possible to use the GDV data in the calculation of the integrity estimate even if it is not used in the calculation of the position fix. FIG. 6 is a flowchart illustrating an example of this. Steps 60, 61, 62, 63, 64 and 66 in FIG. 6 are identical to the corresponding steps in the method of FIG. 5, and will not be described further, for brevity. The difference between the methods of FIG. 5 and FIG. 6 relate to the calculation of the position fix. In the example of FIG. 5, the position fix was calculated (see step 65) based on the corrected ranging measurements produced in step 64—that is, after corrections based on the GDV data had already been applied to the pseudoranges. In contrast, in the example of FIG. 6, the position fix is calculated (in step 65a), using the original, uncorrected ranging measurements that were obtained in step 60. In practice, if a sufficient number of satellites is available, a position fix calculated based on uncorrected ranging measurements (as in step 65a) may be accurate enough to be useful, even though it might not be quite as accurate, in some conditions, as a position fix calculated based on the corrected ranging measurements (as in step 65). Both methods may be viable alternatives, for practical GNSS applications.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of calibrating a vehicle-mounted global navigation satellite system (GNSS) antenna, the method comprising:
   measuring a plurality of phases of the antenna, while mounted on the vehicle, for each of a first plurality of angles in a first angular dimension, and for each of a second plurality of angles in a second angular dimension;
   generating unwrapped phases for each phase of the plurality of phases;
   calculating a phase center offset of the antenna using one or more of the generated unwrapped phases, each of the first plurality of angles, each of the second plurality of angles, and a desired frequency band;
   calculating, for at least one frequency of interest, phase center variations with respect to the first and second angular dimensions, the phase center variations calculated based on the one or more of the generated unwrapped phases; and
   calculating, based on the measured plurality of phases of the antenna, a group delay variation of the antenna, with respect to the first and second angular dimensions.

2. The method of claim 1, wherein generating the unwrapped phases comprises unwrapping the phase along the first angular dimension, followed by unwrapping the phase along the second angular dimension.

3. The method of claim 1, wherein the calculating comprises calculating the group delay variation based on a change of phase center variation with respect to frequency, for the at least one frequency of interest.

4. The method of claim 3, wherein the calculating comprises calculating the group delay variation based on a difference between phase center variations at two different frequencies, centered at the frequency of interest.

5. The method of claim 1, wherein the frequency of interest is a GNSS carrier frequency.

6. The method of claim 1, wherein the measuring is performed in an anechoic chamber.

* * * * *